Oct. 13, 1959 M. WATTER ET AL 2,908,804
UNIVERSAL SPOT WELDER
Filed March 5, 1958 2 Sheets-Sheet 1

INVENTORS
Michael Watter
Walter S. Eggert, Jr.
BY Wm. R. Glisson
ATTORNEY

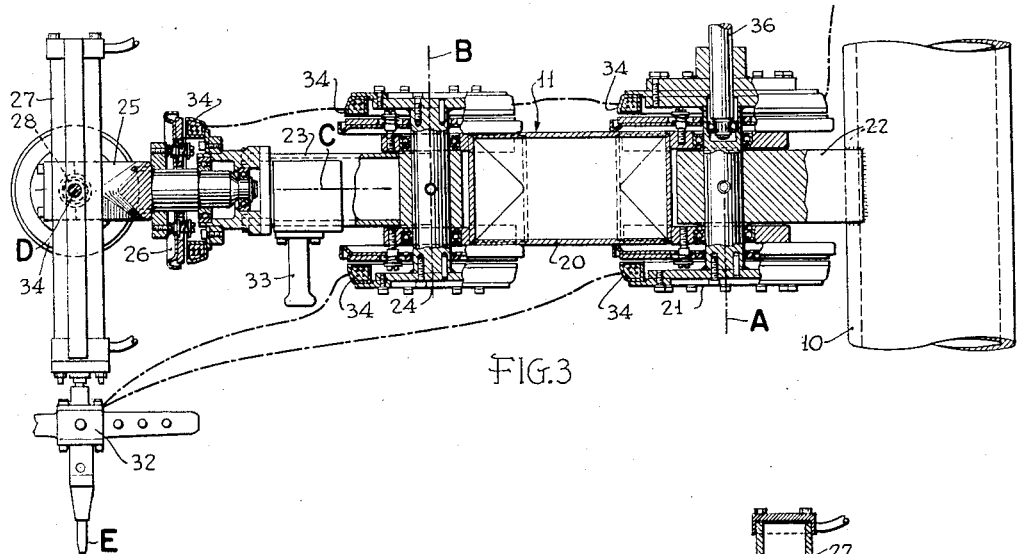
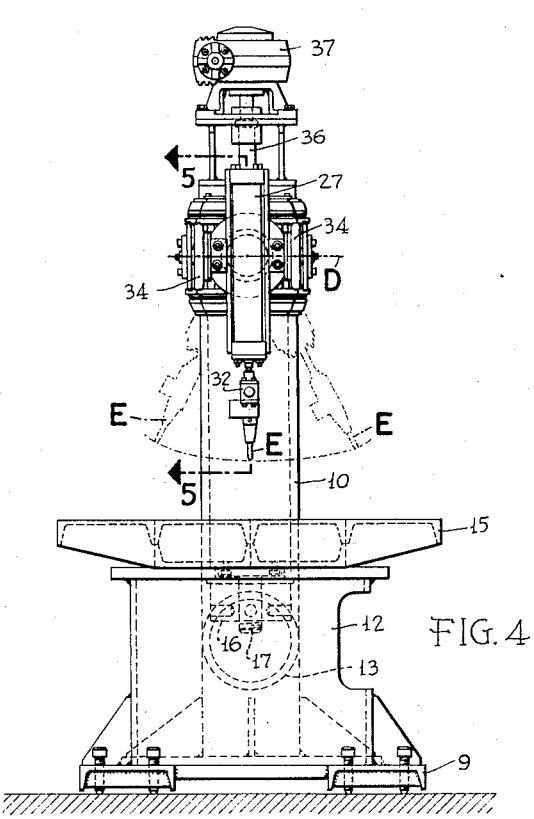
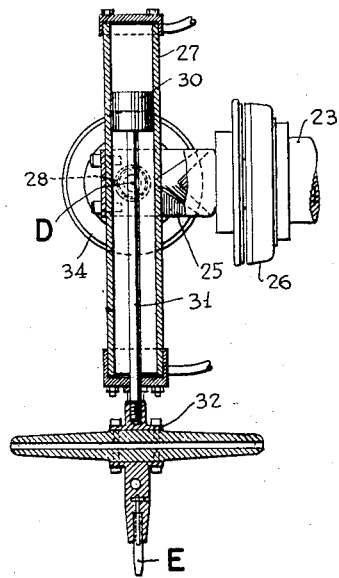

United States Patent Office 2,908,804
Patented Oct. 13, 1959

2,908,804
UNIVERSAL SPOT WELDER

Michael Watter and Walter S. Eggert, Jr., Philadelphia, Pa., assignors to The Budd Company, Philadelphia, Pa., a corporation of Pennsylvania Application March 5, 1958, Serial No. 719,450

7 Claims. (Cl. 219—86)

This invention relates to a universal spot welder and has for an object the provision of improvements in this art.

One of the particular objects of the invention is to provide a spot welder which has a wide range of controlled movements in a great variety of planes and other surfaces to accommodate for welding the many complex airfoils and other intricate shapes encountered in modern technology.

The apparatus hereby provided comprises a work support table which can rotate and which is adjustable in height, in combination with a welding electrode support which provides movement about a plurality of spaced vertical axes, about a plurality of spaced diverse horizontal axes and which provides controlled vertical movement of the electrode. Locking means are provided for certain of the turning joints of the electrode support whereby to cause movements in other directions to be more accurately controlled. Also power means are provided for moving the parts for certain of the movements.

The objects and advantages of the invention will be apparent from the following description of an exemplary embodiment, reference being made to the accompanying drawings thereof wherein:

Fig. 3 is a vertical section taken on the line 3—3 of Fig. 2;

Fig. 4 is an end elevation; and

Fig. 5 is a vertical section taken on the line 5—5 of Fig. 4.

Figure 2:
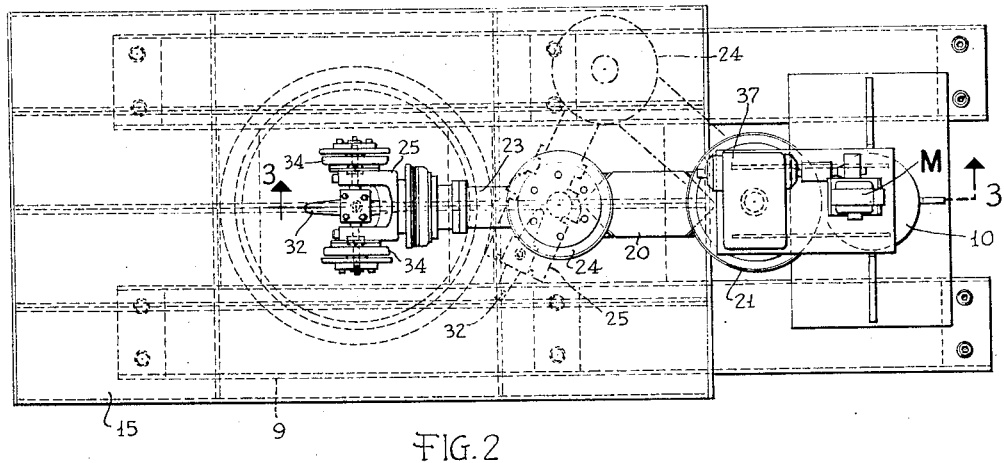
Fig. 2 is a top plan view of the same.

The illustrated embodiment comprises a base 9, a pedestal 10 for supporting an electrode mounting 11, a table base 12, and a connecting beam 13 joining the pedestal 10 and the table base 12.

A table 15 is rotatable on the base 12 and is adjustable in height by a large nut 16 threaded on a depending stem 17 of the table and having a flange rotatably and non-slidably retained in the top of the base 12.

The mounting 11 for the electrode E comprises a compound jointed arm which includes an inner bar 20 pivoted at a joint 21 to a stub support 22 of the pedestal 10 to turn about a first vertical axis A, an intermediate bar 23 pivoted at a joint 24 to the inner bar 20 to turn about a second vertical axis B, an outer bar 25 pivoted at a joint 26 to the intermediate bar 23 to turn about a first horizontal axis C, and a cylinder 27 pivoted at a joint 28 to the outer bar 25 to turn about a second horizontal axis D.

A piston 30 operates within the cylinder 27 and is provided with a piston rod 31 extending out of the lower end of the cylinder. At its lower end the piston rod 31 carries a handle and control fitting 32 which also mounts the electrode E. Fluid lines are provided for fluid to control the height of the piston in the cylinder, controls for the fluid lines preferably being carried on the electrode handle fitting. Such hand controls can be understood without illustration. The electrode may also be provided with fluid cooling means which is usual and requires no illustration.

A handle projection 33 is provided on the outer bar 25 to aid in moving the jointed arm about.

Each of the joints 21, 24, 26 and 28 is provided with locking means to hold the hinged parts in various adjusted positions, the locking means 34 here shown being of the electromagnetic type. Ball bearings in the assembly provide very easy movement when the parts are not locked together.

The parts at the joints may be turned by power means if desired and such a power device is shown for the joint 21. The power device comprises a shaft 36, a gear box 37 and a drive motor M.

The magnetic joint clutches and the joint motive power means are preferably controlled from the electrode control handle fitting 32. Diagrammatically, electric control cables are shown to extend to the handle fitting; but this showing is largely for purposes of illustration and it will be understood that on the unit as built the cables are neatly arranged and proportioned in length to allow all necessary movements of parts without fouling.

Figure 1:
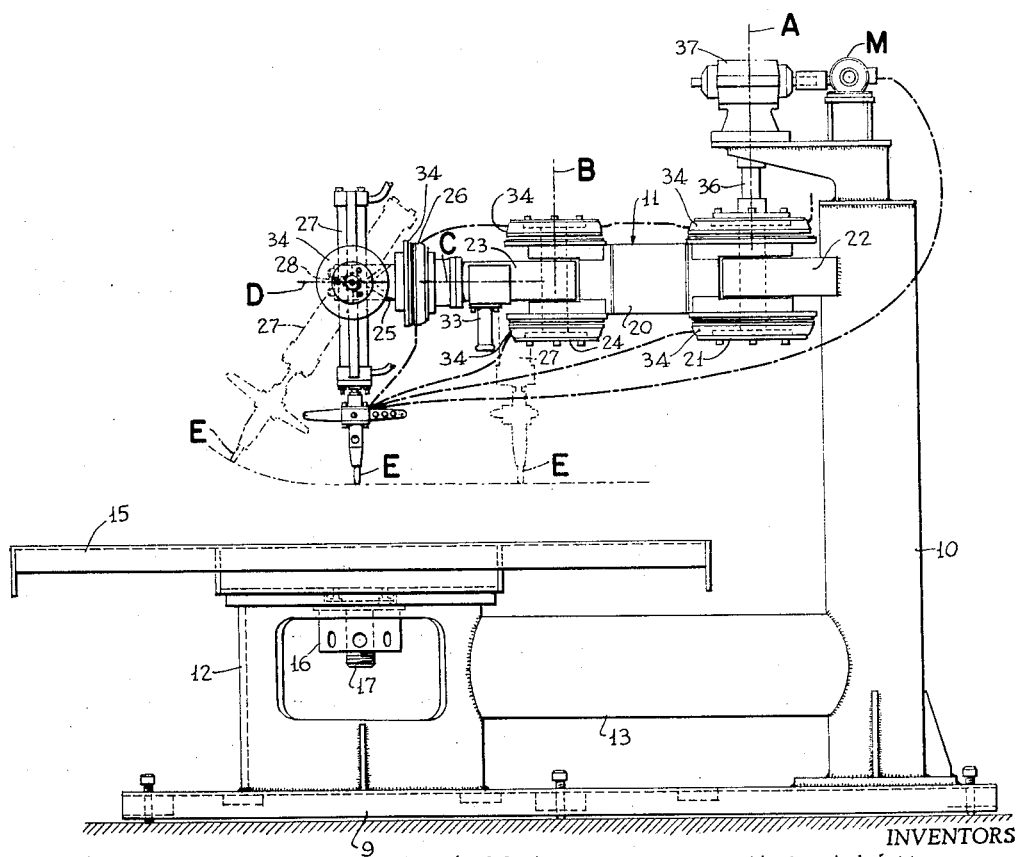
Fig. 1 is a side elevation of welding apparatus embodying the invention.

The operation of the apparatus will be clear from the description of its character and movements. A workpiece, not shown, is secured on the table 15 and brought to the desired height and orientation. Then the electrode handle fitting 32 is grasped by the operator and by proper manipulation and operation of controls the electrode is brought into the desired position of use. The parts are locked against further movement at such joints as are desired to be held in fixed position. Figs 1 and 2 show in dotted lines how the electrode may be moved in and out relative to the pedestal and also how the electrode and cylinder may be swung about the second horizontal axis D to follow an arcuate path. Fig. 4 in dotted lines shows swinging movement about the first horizontal axis C.

It is thus seen that the invention provides a universal welder which has a number of joints so located as to permit the electrode to follow a great variety of weld lines and to make power-pressure welds (as distinguished from hand welders which are very limited as to possible pressure and position control) which could not otherwise be conveniently made. The apparatus is relatively simple and easy to operate.

While one embodiment of the invention has been described for purposes of illustration it is to be understood that there may be various embodiments and modifications within the general scope of the invention.

What is claimed is:

1. Welding apparatus comprising in combination, a base, a workpiece support table mounted on said base, means for adjusting the elevation of the table on said, base a pedestal located adjacent said table and base, electrode supporting means mounted on said pedestal for operation on a workpiece mounted on said table, said electrode supporting means comprising a compound arm having a plurality of bars and connecting joints between said bars providing movement about a plurality of laterally spaced vertical axes adjacent the pedestal and a horizontal axis located outwardly beyond the vertical-joint axis, and an electrode holder mounted on the outer end of said compound arm and having a joint therewith providing turning movement about another horizontal axis which is disposed at right angles to the first horizontal axis, said electrode holder including means for adjusting the elevation of the electrode.

2. Welding apparatus as set forth in claim 1, which further includes means for selectively locking the joints of said compound arm against turning movement.

3. Welding apparatus as set forth in claim 1, which further includes power means for turning the parts at one of the joints of said compound arm.

4. Welding apparatus comprising in combination, a pedestal, a compound electrode support mounted on said pedestal, said support comprising a plurality of members and joints between them providing movement about two spaced parallel vertical axes adjacent the pedestal and two horizontal axes disposed at an angle to each other located outwardly beyond the vertical-joint axes, and means on said support for changing the elevation of the electrode.

5. Welding apparatus as set forth in claim 4, which further includes means for selectively locking certain of said joints against turning.

6. Welding apparatus as set forth in claim 4, which further includes means for selectively locking against turning movement the joints which have turning movement about vertical axes and one of the joints having movement about a horizontal axis.

7. Welding apparatus as set forth in claim 4, which further includes power means for turning the parts at one of the joints of said compound arm.

References Cited in the file of this patent

UNITED STATES PATENTS

| | | |
|---|---|---|
| 1,067,478 | Gravell | July 15, 1913 |
| 1,168,385 | Fulda | Jan. 18, 1916 |
| 2,122,933 | Eckman | July 5, 1938 |